(12) United States Patent
Umetani

(10) Patent No.: US 9,203,304 B2
(45) Date of Patent: Dec. 1, 2015

(54) SWITCHING REGULATOR

(71) Applicant: DENSO CORPORATION, Kariya, Aichi-pref. (JP)

(72) Inventor: Kazuhiro Umetani, Nagoya (JP)

(73) Assignee: DENSO CORPORATION, Kariya (JP)

( * ) Notice: Subject to any disclaimer, the term of this patent is extended or adjusted under 35 U.S.C. 154(b) by 150 days.

(21) Appl. No.: 14/154,265

(22) Filed: Jan. 14, 2014

(65) Prior Publication Data

US 2014/0197813 A1 Jul. 17, 2014

(30) Foreign Application Priority Data

Jan. 16, 2013 (JP) .................................. 2013-5569

(51) Int. Cl.
*H02M 3/156* (2006.01)
*H02M 1/00* (2007.01)
(52) U.S. Cl.
CPC ...... *H02M 3/156* (2013.01); *H02M 2001/0019* (2013.01); *H02M 2001/0025* (2013.01)
(58) Field of Classification Search
CPC .......... H02M 3/156; H02M 2001/009; H02M 2001/0025
USPC ........................... 323/222, 224, 259, 282–288
See application file for complete search history.

(56) References Cited

U.S. PATENT DOCUMENTS

| 4,418,380 | A | * | 11/1983 | Tanaka et al. .................... 363/10 |
| 4,757,434 | A | * | 7/1988 | Kawabata et al. ............... 363/41 |
| 5,666,275 | A | * | 9/1997 | Inokuchi et al. ................ 363/35 |
| 6,784,649 | B1 | | 8/2004 | Ohms |
| 8,810,176 | B2 | * | 8/2014 | Kawakami et al. ...... 318/400.22 |
| 2002/0135345 | A1 | | 9/2002 | Terashi |
| 2009/0160252 | A1 | * | 6/2009 | Kojima et al. ................... 307/24 |
| 2011/0043771 | A1 | * | 2/2011 | Hirao .............................. 353/85 |
| 2013/0342139 | A1 | * | 12/2013 | Shimomugi et al. ....... 318/400.3 |

FOREIGN PATENT DOCUMENTS

| JP | 2002-084743 | A | 3/2002 |
| JP | 2005-051927 | A | 2/2005 |
| JP | 2006-262654 | A | 9/2006 |
| JP | 2006-271089 | A | 10/2006 |
| JP | 2012-200079 | A | 10/2012 |

OTHER PUBLICATIONS

Office Action mailed Mar. 10, 2015 in the corresponding JP application No. 2013-005569 (with English translation).

* cited by examiner

*Primary Examiner* — Timothy J Dole
*Assistant Examiner* — Ishrat Jamali
(74) *Attorney, Agent, or Firm* — Posz Law Group, PLC

(57) ABSTRACT

In a switching regulator, a control circuit includes a reference command value generation portion and an additional command value generation portion. The reference command value generation portion generates a reference command value based on a deviation of an output voltage from a predetermined command voltage. The additional command value generation portion generates an additional command value based on a difference between an outflow electric energy and an inflow electric energy. The outflow electric energy is a value reflecting a supply power from the capacitor to the load, and the inflow electric energy is a value reflecting a supply power from the reactor to the capacitor. The control circuit controls an operation ratio of a switching circuit based on the reference command value and the additional command value.

13 Claims, 13 Drawing Sheets

SWITCHING REGULATOR

CROSS REFERENCE TO RELATED APPLICATIONS

The present application is based on and claims priority to Japanese Patent Application No. 2013-5569 filed on Jan. 16, 2013, the contents of which are incorporated in their entirety herein by reference.

TECHNICAL FIELD

The present disclosure relates to a switching regulator.

BACKGROUND

A current mode control is known as one of control methods of a chopper switching regulator. In the current mode control, a detection result of a reactor current is incorporated in a feedback loop that controls a switching time based on an error signal indicating error of a measured value with respect to a command value of an output voltage. Accordingly, the reactor current is controlled in accordance with change in output voltage.

In a case where a load current drastically changes, until the control follows the change, electric charge is supplied from a smoothing capacitor connected between output terminals to which a load is connected. Because change in an output voltage (i.e., a voltage between both ends of a capacitor) and change in the error signal appear later than change in the load current, a response of the control delays, and the output voltage is temporarily reduced due to the delay of the response.

JP-A-2002-281742 (corresponding to US 2002/0135345 A1) discloses a control method in which a difference between the reactor current and the load current is incorporated in the feedback loop. In a buck circuit, the difference between the reactor current and the load current corresponds to a change component of the load current. Thus, the control can directly respond to the change in the load current and can reflect the change in the load current on the reactor current.

However, a device disclosed in JP-A-2002-281742 can be applied only to a switching regulator (e.g., a buck switching regulator) in which a reactor current corresponds with an output current in a steady operation state.

In a boost switching regulator, a reactor current does not correspond with an output current even in a steady operation state. Thus, the device cannot detect change in the load current with accuracy and cannot improve a response to the load current sufficiently.

SUMMARY

It is an object of the present disclosure to provide a switching regulator having a high responsivity with respect to a load current regardless of type such as boost or buck.

A switching regulator according to an aspect of the present disclosure includes two input terminals to which a direct-current voltage is applied, two output terminals, a reactor, a capacitor disposed between the output terminals and charged with a supply current from the reactor, a switching circuit, and a control circuit. The switching circuit has a first operation state in which the direct-current voltage is supplied through the input terminals to two ends of the reactor and a second operation state in which at least the reactor and a load connected between the output terminals form a closed circuit. The switching circuit switches an operation state between the first, operation state and the second operation state. The control circuit controls an operation ratio of the first operation state and the second operation state in the switching circuit.

The control circuit includes a reference command value generation portion and an additional command value generation portion. The reference command value generation portion generates a reference command value based on a deviation of an output voltage, which is a voltage across the output terminals, from a predetermined command voltage. The additional command value generation portion generates an additional command value based on a difference between outflow electric energy and inflow electric energy, the outflow electric energy is a value reflecting a supply power from the capacitor to the load, the inflow electric energy is a value reflecting a supply power from the reactor to the capacitor.

The control circuit controls the operation ratio based on the reference command value and the additional command value such that the smaller the output voltage becomes compared with the command voltage and the larger the outflow electric energy becomes compared with the inflow electric energy, the larger a ratio of the first operation state becomes.

The switching regulator can detect a change in a load current with accuracy even if a reactor current is different from the load current in a steady operation state. Thus, the switching regulator can maintain the output voltage with accuracy.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Embodiment of the present disclosure will be described below with reference to the drawings.

First Embodiment

A switching regulator 1 according to a first embodiment of the present disclosure can be suitably applied to a chopper switching regulator that operates as a boost converter.

Figure 1:
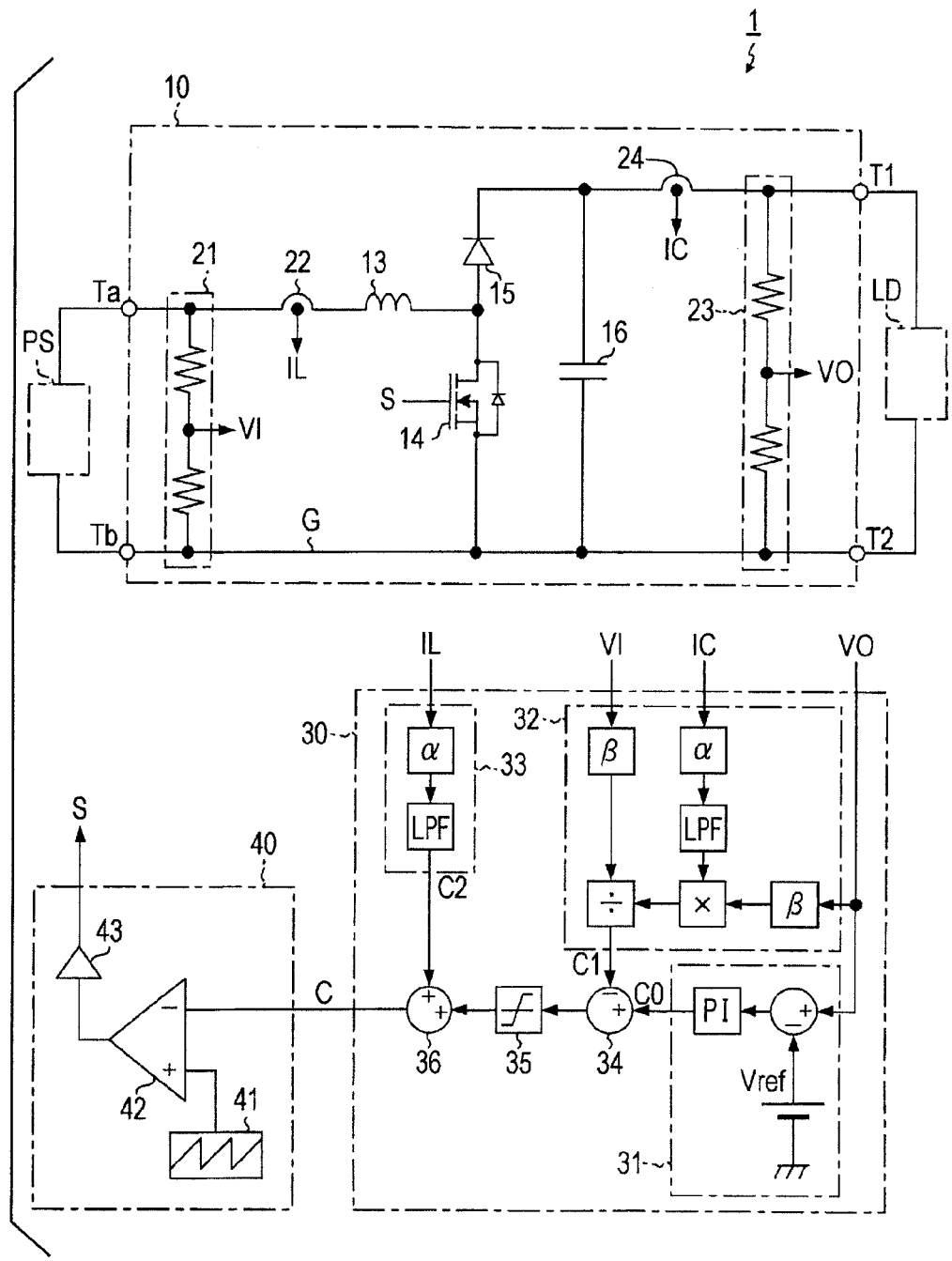
FIG. 1 is a circuit diagram showing a switching regulator according to a first embodiment.

As shown in FIG. 1, the switching regulator 1 includes a circuit section 10, a command value generation section 30, and a control signal generation section 40. The circuit section 10 operates by receiving power from a direct-current (DC) power supply PS and supplies power to a load LD at a predetermined command voltage. The command value generation section 30 generates a command value C based on an input voltage VI, a reactor current IL, an output voltage VO, and an output current IC. The control signal generation section 40 generates a switching signal S to control the circuit section 10 based on the command value generated by the command value generation section 30.

The circuit section 10 includes input terminals Ta, Tb, a choke coil 13, and a switching element 14. The input terminals Ta, Tb are connected to the DC power supply PS. The choke coil 13 is a reactor connected to form a closed circuit with the DC power supply PS. The switching element 14 connects or disconnects a current path from the choke coil 13 to a ground line G, which is connected to the input terminal Tb on a negative electrode side of the DC power supply PS, based on the switching signal S. The switching element 14 is a known N-type field-effect transistor including a parasitic diode that enables electric current to flow from a source to a drain.

The circuit section 10 further includes a diode 15 and a capacitor 16. The diode 15 is connected between an output terminal T1 on a positive electrode side and a connection point of the choke coil 13 and the switching element 14. The diode 15 has a forward direction in a direction from the choke coil 13 to the output terminal T1. The capacitor 16 for smoothing is connected between the output terminals T1, T2.

The circuit section 10 further includes a voltage dividing circuit 21, a current detector 22, a voltage dividing circuit 23, and a current detector 24. The voltage dividing circuit 21 includes a pair of resistors connected in series. The voltage dividing circuit 21 is connected between the input terminals Ta, Tb. The voltage dividing circuit 21 generates the input voltage signal VI proportional to an applied voltage between the input terminals Ta, Tb (i.e., a power voltage supplied from the DC power supply PS). The current detector 22 is disposed on a current path from the input terminal Ta on the positive electrode side of the DC power supply PS to the choke coil 13 and detects the reactor current IL that flows to the choke coil 13. The voltage dividing circuit 23 includes a pair of resistors connected in series. The voltage dividing circuit 23 generates the output voltage signal VO proportional to a voltage between the output terminals T1, T2, The current detector 24 is disposed on a current path from a cathode of the diode 15 to the output terminal T1. The current detector 24 is located at a position closer to the output terminal T1 than a position to which the capacitor 16 is connected and detects the output current IC that flows to the load LD connected between the output terminals T1, T2. The voltage dividing circuits 21, 23 are configured to have the same voltage dividing ratio.

When the switching element 14 is on, electric current flows in the closed circuit formed by the DC power supply PS and the choke coil 13 (hereafter, this state is referred to as a first operation state), and electromagnetic energy is stored in the choke coil 13. On the other hand, when the switching element 14 is off, electric current flows in a closed circuit formed by the DC power supply PS, the choke coil 13, the diode 15, and the load LD connected between the output terminals T1, T2. Hereafter, this state is referred to as second operation state. At this time, a voltage obtained by adding the voltage between both ends of the choke coil 13 to the power supply voltage of the DC power supply PS (i.e., a voltage boosted by the power supply voltage) is applied to the load LD through the diode 15.

In the first operation state, the reactor current increases with increase in electromagnetic energy stored in the reactor. The increase in the reactor current means the increase in the input current, Thus, when a duty ratio of the switching signal S increases, electric power supplied from the DC power supply PS through the input terminals Ta, Tb increases, and power supplied from the choke coil 13 to the output terminals T1, T2 increases.

The command value generation section 30 includes a reference command value generation portion 31, a first additional command value generation portion 32, and a second additional command value generation portion 33. The reference command value generation portion 31 generates a reference command value CO based on the output voltage VO. The first additional command value generation portion 32 generates a first additional command value C1 based on the input voltage VI, the output voltage VO, and the output current IC. The second additional command value generation portion 33 generates a second additional command value C2 based on the reactor current IL.

The command value generation section 30 further includes an adder 34, a limiter 35, and an adder 36. The adder 34 reflects the first additional command value C1 generated by the first additional command value generation portion 32 on the reference command value generated by the reference command value generation portion 31. The limiter 35 limits an output of the adder 34 to a predetermined upper limit value when the output is greater than the upper limit value and limits the output of the adder 34 to a predetermined lower limit value when the output is less than the lower limit value. The adder 36 generates the command value C by reflecting the second additional command value C2 generated by the second additional command value generation portion 33 on an output of the limiter 35.

The reference command value generation portion 31 calculates a deviation of the output voltage VO from a reference voltage Vref. The reference voltage Vref has a magnitude obtained by dividing the command voltage at the same voltage dividing ratio with the voltage dividing circuits 21, 23. The reference command value generation portion 31 performs a PI (integration, proportion) operation to the deviation to generate the reference command value.

The first additional command value generation portion 32 divides the product of ($\alpha \times IC$) and ($\beta \times VO$) by ($\beta \times VI$) to generate the first additional command value C1 (=$\alpha \times VO/VI$), where ($\alpha \times IC$) is the output current IC multiplied by a factor $\alpha$ and treated with a low-pass filter, ($\beta \times VO$) is the output voltage VO multiplied by a factor $\beta$, and ($\beta |VI$) is the input voltage VI multiplied by the factor $\beta$. In other words, the first additional command value C1 is an estimated value of the reactor current calculated from the output voltage VO, the output current IC, and the input voltage VI on the assumption that the circuit section 10 is in a steady operation state. The first additional command value C1 indicates outflow electric energy proportional to electric power supplied from the capacitor 16 to the load connected between the output terminals T1, 12 (i.e., electric power output from the capacitor 16).

The second additional command value generation portion 33 generates the second additional command value C2 (=α× IL) by treating the reactor current IL multiplied by the factor α with the low-pass filter. In other words, the second additional command value C2 indicates inflow electric energy proportional to electric power supplied from the choke coil 13 to the capacitor 16 (i.e., electric power input to the capacitor 16).

The adder 34 adds the first additional command value C1 having an inverted polarity to the reference command value C0. The adder 36 adds the second additional command value C2 to the output of the limiter 35. Thus, when the limiter 35 does not limit the input value, the command value C can be expressed by C=C0−(C1−C2).

When the circuit section 10 is in the steady operation state, C1=C2. Thus, the command value C is equal to the reference command value C0. When a bad power changes in an increasing direction, a relationship of C1>C2 is satisfied temporarily. When the load power changes in a decreasing direction, a relationship of C1<C2 is satisfied temporarily.

In other words, the larger the output voltage VO becomes compared with the reference voltage Vref or the more the load power changes in the decreasing direction, the larger the command value C becomes. The control signal generation section 40 includes a saw-tooth wave generation circuit 41, a comparator 42, and a driver circuit 43. The saw-tooth wave generation circuit 41 generates a saw-tooth wave. The comparator 42 generates a pulse width modulation (PWM) signal by comparing the saw-tooth wave generated by the saw-tooth wave generation circuit 41 with the command value generated by the command value generation section 30. The driver circuit 43 is connected to an output terminal of the comparator 42. An output signal of the driver circuit 43 is supplied as the switching signal S to the switching element 14.

When the command value C increases, the duty ratio of the switching signal S decreases. Thus, electric power supplied from the input terminals Ta, Tb (i.e., from the DC power supply PS) to the output terminals T1, 72 through the choke coil 13 decreases with increase in the command value C and increases with decrease in the command value C.

As described above, the switching regulator 1 detects the load change from the difference between the estimated value of the reactor current IL indicating the outflow electric energy and the measured value of the reactor current IL indicating the inflow electric energy and reflects the load change on the command value C for determining the duty ratio of the switching signal S. Thus, even when the reactor current IL does not correspond with the output current IC in the steady operation state, the switching regulator 1 can detect the load change with accuracy and can achieve control in response to the load change.

The switching regulator 1 includes the limiter 35 that limits the command value C. Thus, the switching regulator 1 can restrict flow of excessive reactor current IL.

Next, a load responsivity of the switching regulator 1 according to the present embodiment and a load responsivity of a switching regulator including the circuit section 10 and applied with a conventional technique will be considered. Specifically, the stabilities of the output voltages VO with respect to the load change are shown by comparing the magnitudes of disturbance of the output voltages VO generated in a case where a minute disturbance component is put on the load current (i.e., the output current IC) when the circuit section 10 is in the steady operation state.

For simplification, the factor β, LPF, the limiter 35 are omitted from consideration. In the switching regulator applied with the conventional technique, the output current IC becomes the first additional current value C1, and the reactor current IL becomes the second additional command value C2.

When the duty ratio of the switching signal S is denoted by D, the inductance of the choke coil 13 is denoted by L, and the capacitance C of the capacitor 16 is denoted by C, the operation of the circuit section 10 can be expressed by following equations (1), (2).

$$\frac{dIL}{dt} = -\frac{1-D}{L} \cdot VO + \frac{1}{L} \cdot VI \quad (1)$$

$$\frac{dVO}{dt} = \frac{1-D}{C} \cdot IL - \frac{1}{C} \cdot IC \quad (2)$$

When the equation (1) is solved for D and is substituted in the equation (2), the following equation (3) is obtained.

$$\frac{dVO}{dt} = \frac{IL}{C} \cdot \frac{VI}{VO} - \frac{IL}{C} \cdot \frac{L}{VO} \cdot \frac{dIL}{dt} - \frac{IC}{C} \quad (3)$$

The steady components of the reactor current the output voltage VO, and the output current IC in the steady operation are respectively denoted by IL, VO, IC, and minute disturbance components are respectively denoted by ΔIL, ΔVO, ΔIC. In equations (1), (3), when IL is replaced by IL+ΔIL, VO is replaced by VO+ΔVO, IC is replaced by IC+ΔIC, and a time differential is replaced by Laplace operator s, the following equations (4), (5) are obtained.

In derivation of the equation (3), it is assumed that the input electric power is equal to the output electric power in the steady state, that is, VI×IL=VO×IC.

$$s \cdot \Delta IL = -\frac{(VO + \Delta VO)}{L} \cdot (1-D) + \frac{VI}{L} \quad (4)$$

$$s \cdot \Delta VO = \frac{VI}{C(VO + \Delta VO)} \cdot \Delta IL - \frac{IL + \Delta IL}{C} \cdot \frac{L}{VO + \Delta VO} \cdot s \cdot \Delta IL - \frac{\Delta IC}{C} + \frac{VI \cdot IL}{C} \left(\frac{1}{VO + \Delta VO} - \frac{1}{VO}\right) \quad (5)$$

In the switching regulator applied with the conventional technique, the duty ratio D is expressed by the following equation (6). In the switching regulator 1 according to the present embodiment, the duty ratio D is expressed by the following equation (7). The gain and the time constant in the PI control are respectively denoted by K, T, and the factor of the PWM modulation is set to 1.

$$D = -\left(K + \frac{1}{Ts}\right) \cdot \Delta VO - \alpha \cdot \Delta IL - \alpha \cdot IL + \alpha \cdot \Delta IC + \alpha \cdot IC \quad (6)$$

$$D = -\left(K + \frac{1}{Ts}\right) \cdot \Delta VO - \alpha \cdot \Delta IL - \alpha \cdot IL + \alpha \cdot \frac{VO}{VI} \cdot \Delta IC + \alpha \cdot \frac{VO}{VI} \cdot IC \quad (7)$$

When the equation (6) is substituted in the equations (4), (5) and is developed using approximation to ignore minute terms and relationships satisfied in the steady state, the following equation (8) is obtained. When the equation (7) is substituted in the equations (4), (5) and is developed similarly, the following equation (9) is obtained.

$$\Delta VO = -\frac{L \cdot T(1 + \alpha \cdot IL)s^2 + \alpha \cdot T(VO - VI)s}{(L \cdot C \cdot T)s^3 + T\{\alpha \cdot C \cdot VO - L \cdot IL \cdot K\}s^2 +} \cdot \Delta IC \quad (8)$$
$$\{A \cdot T \cdot VI - L \cdot IL\}s + VI$$

where $$A = \frac{IL}{VO}\alpha + \frac{VI}{VO^2} + K$$

$$\Delta VO = -\frac{L \cdot T\left(1 + \alpha \cdot IL \cdot \frac{VO}{VI}\right)s^2}{(L \cdot C \cdot T)s^3 + T \cdot \{\alpha \cdot C \cdot VO - L \cdot IL \cdot K\}s^2 +} \cdot \Delta IC \quad (9)$$
$$(A \cdot T \cdot VI - L \cdot IL)s + VI$$

The equations (8), (9) show change in the output voltages with respect to the minute load current change. In the equations (8), (9), denominators are equal to each other. When the minimum degrees of polynomials of numerators are compared, that in the equation (8) corresponding to the switching regulator applied with the conventional technique is first degree, and that in the equation (9) corresponding to the switching regulator 1 according to the present embodiment is second degree.

When the load current change is assumed as a sufficiently gentle minute sine wave fluctuation, because s is proportional to the frequency, terms of s greater than second degree is so small as to be ignored. Thus, the voltage change of the switching regulator 1 according to the present embodiment is smaller than the switching regulator applied with the conventional technique with respect to the gentle load change.

Thus, the switching regulator 1 according to the present embodiment can improve a load followability of the output.

<Modification>

In the above-described embodiment, the reference command value generation portion 31 outputs the result of the PI control of the deviation between the output voltage VO and the reference voltage Vref as the reference command value C0. However, the reference command value generation portion 31 may output the result of time integration of the deviation or the result of constant multiplication of the deviation as the reference command value C0.

In the above-described embodiment, the command value generation section 30 treats with the low-pass filter after multiplying the reactor current IL and the output current IC with the factor α. However, the low-pass filter may be omitted. The multiplication by the factor α with respect to the reactor current IL and the output current IC and the multiplication by the factor β with respect to the input voltage VI and the output voltage VO may be omitted. In addition, the limiter 35 may be omitted.

Figure 2A:
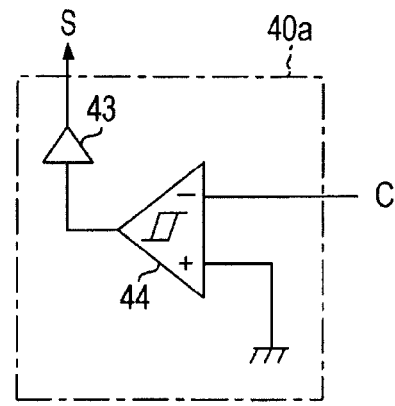
FIG. 2A is a circuit diagram showing a modification of a control signal generation section.

The control signal generation section 40 does not always have to include the saw-tooth wave generation circuit 41 and the comparator 42. Similarly to a control signal generation section 40a shown in FIG. 2A, the control signal generation section 40 may perform a positive-negative polarity determination using a hysteresis comparator 44, in which one terminal receives the command value C and the other terminal is grounded, or a normal comparator (not shown).

Figure 2B:
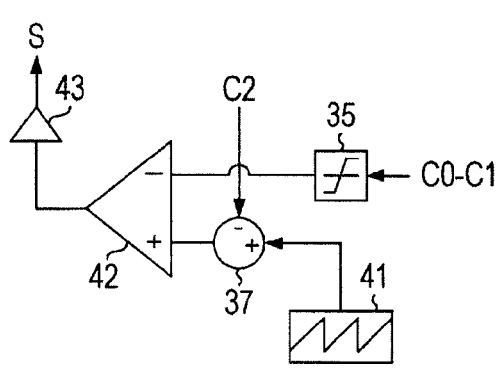
FIG. 2B is a circuit diagram showing another modification of a control signal generation section.

Alternatively, as shown in FIG. 2B, instead of reflecting the second additional command value C2 on the output of the limiter 35 (i.e., the value obtained by reflecting the first additional command value C1 on the reference command value C0), the second additional command value C2 may be reflected on the output of the saw-tooth wave generation circuit 41. In this case, the second additional command value C2 may be reflected with a polarity opposite from a case where the second additional command value C2 is reflected on the output of the limiter 35. In other words, using a different operation method that is mathematically equivalent, the reference command value C0, the first additional command value C1, and the second additional command value C2 may be reflected on the command value C.

Second Embodiment

A switching regulator 1 according to a second embodiment of the present disclosure will be described. The switching regulator 1 according to the present embodiment has a configuration similar to the switching regulator 1 according to the first embodiment except that the switching regulator 1 according to the present embodiment includes a command value generation circuit 30a instead of the command value generation circuit 30.

Figure 3:
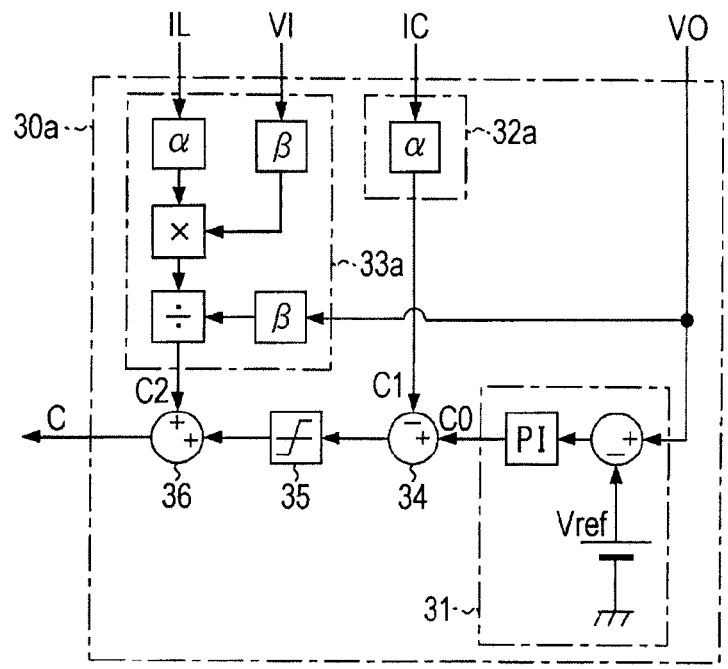
FIG. 3 is a circuit diagram showing a command value generation section in a switching regulator according to a second embodiment.

As shown in FIG. 3, the command value generation section 30a according to the present embodiment includes a first additional command value generation portion 32a and a second additional command value generation portion 33a.

The first additional command value generation portion 32a outputs the output current IC multiplied by the factor α as a first additional command value C1 The second additional command value generation portion 33a outputs the result of dividing the product of the reactor current IL multiplied by the factor α and the input voltage VI multiplied by the factor β (i.e., the value proportional to the input electric power) by the output voltage VO multiplied by the factor β (i.e., the estimated value of the output current IC calculated on the assumption that the circuit section 10 is in the steady operation state) as a second additional command value C2.

As described above, the switching regulator 1 according to the present embodiment detects the load change based on the difference between the measured value of the output current IC that indicates the outflow electric energy and the estimated value of the output current IC that indicates the inflow electric energy, and reflects the load change on the command value C. Thus, the switching regulator 1 according to the present embodiment can achieve effects similar to the first embodiment.

With regard to the load responsivity, in the equation (9), it is only necessary to replace α by αVI/VO. Thus, it is clear that the switching regulator 1 according to the present embodiment can achieve the effects similar to the first embodiment.

Third Embodiment

A switching regulator 1 according to a third embodiment of the present disclosure will be described.

Figure 4:
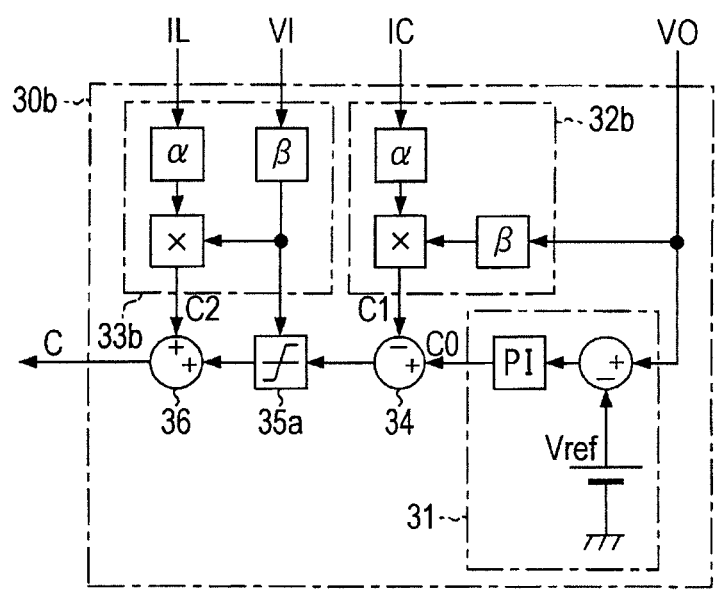
FIG. 4 is a circuit diagram showing a command value generation section in a switching regulator according to a third embodiment.

The switching regulator 1 according to the present embodiment has a configuration similar to the switching regulator 1 according to the first embodiment except that the switching regulator 1 according to the present embodiment includes a command value generation circuit 30b instead of the command value generation circuit 30. As shown in FIG. 4, the command value generation section 30b includes a first additional command value generation portion 32b, a second additional command value generation portion 33b, and a limiter 35.

The first additional command value generation portion 32b outputs the product of the output current IC multiplied by the factor α and the output voltage VO multiplied by the factor β (i.e., the value proportional to the output electric power) as a first additional command value C1.

The second additional command value generation portion 33b outputs the product of the reactor current IL multiplied by the factor α and the input voltage VI multiplied by factor β (i.e., the value proportional to the input electric power) as a second additional command value C2.

The limiter 35a is configured so that an upper limit and a lower limit are changed in proportional to the input voltage VI multiplied by the factor β. When electric power greater than or equal to a predetermined electric power is input, the limiter 35a restricts input of further electric power. Because the upper limit value and the lower limit value are proportional to the input electric power, the input current value has upper and lower limits.

As described above, the switching regulator 1 according to the present embodiment detects the load change based on the difference between the electric power indicating the outflow electric energy and calculated from the output current IC and the output voltage VO and the electric power indicating the inflow electric energy and calculated from the input current IC and the input voltage VI, and reflects the load change on the command value C. Thus, the switching regulator 1 according to the present embodiment can achieve effects similar to the first embodiment.

With regard to the load responsivity, in the equation (9), it is only necessary to replace α by αVVI. Thus, it is clear that the switching regulator 1 according to the present embodiment can achieve the effects similar to the first embodiment.

Fourth Embodiment

A switching regulator 2 according to a fourth embodiment of the present disclosure will be described.

Figure 5:
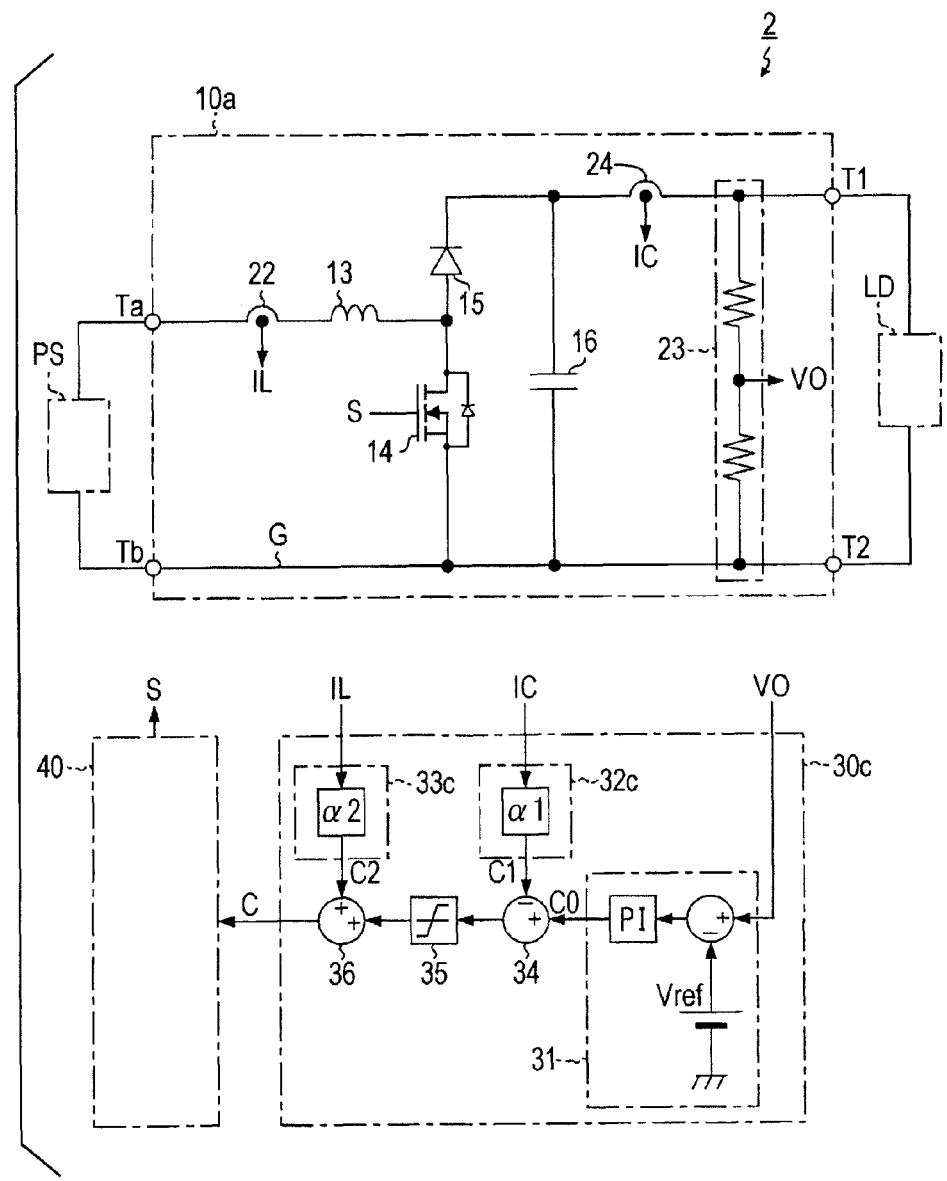
FIG. 5 is a circuit diagram showing a switching regulator according to a fourth embodiment.

As shown in FIG. 5, the switching regulator 2 includes a circuit section 10a, a command value generation circuit 30c, and a control signal generation section 40. Because the control signal generation section 40 is similar to the control signal generation section 40 described in the first embodiment, description of the control signal generation section 40 will be omitted, and the circuit section 10a and the command value generation section 30c will be mainly described below.

The circuit section 10a has a configuration similar to the circuit section 10 except that the dividing circuit 21 is omitted. The switching regulator 2 according to the present embodiment is used under the condition that the voltage supplied from the DC power supply PS (i.e., the input voltage VI) and the voltage applied to the load (i.e., the output voltage VO) are intended to almost satisfy a relationship expressed by the following equation (10), that is, the ratio of the input voltage VI and the output voltage VO is constant in the steady operation state.

$$\frac{VI}{VO} = \frac{\alpha 2}{\alpha 1} \tag{10}$$

The command value generation section 30c includes a first additional command value generation portion 32c and a second additional command value generation portion 33c.

The first additional command value generation circuit 32c outputs the output current IC multiplied by a factor α1 as a first additional command value C1 The second additional command value generation circuit 33c outputs the reactor current IL multiplied by a factor a2 as a second additional command value C2.

In other words, when the circuit section 10a is in the steady operation state, the following equation (11) is satisfied. When the equation (11) is developed using the equation (10) to the equation (12), and the equation (12) is developed, the following equation (13) is obtained.

$$VO \times IC = VI \times IL \tag{11}$$

$$VO \times IC = \frac{\alpha 2}{\alpha 1} \times VO \times IL \tag{12}$$

$$\alpha 1 \times IC = \alpha 2 \times IL \tag{13}$$

In the equation (13), a left-hand member is the first additional command value C1 indicating the outflow electric energy and a right-hand member is the second additional command value C2 indicating the inflow electric energy. The switching regulator 2 according to the present embodiment detects the load change based on the difference between the value ($\alpha 1 \times IC$) indicating the outflow current and calculated by multiplying the output current IC by the factor α1 and the value ($\alpha 2 \times IC$) indicating the inflow electric energy and calculated by multiplying the reactor current IL by the factor α2, and reflects the load change on the command value C. Thus, the switching regulator 2 can achieve effects similar to the first embodiment.

<Modification>

In the above-described embodiment, both of the output current IC and the reactor current IL are multiplied by the factors. However, only the reactor current IL may be multiplied by α2/α1 or only the output current IC may be multiplied by α1/α2.

Fifth Embodiment

Figure 6:
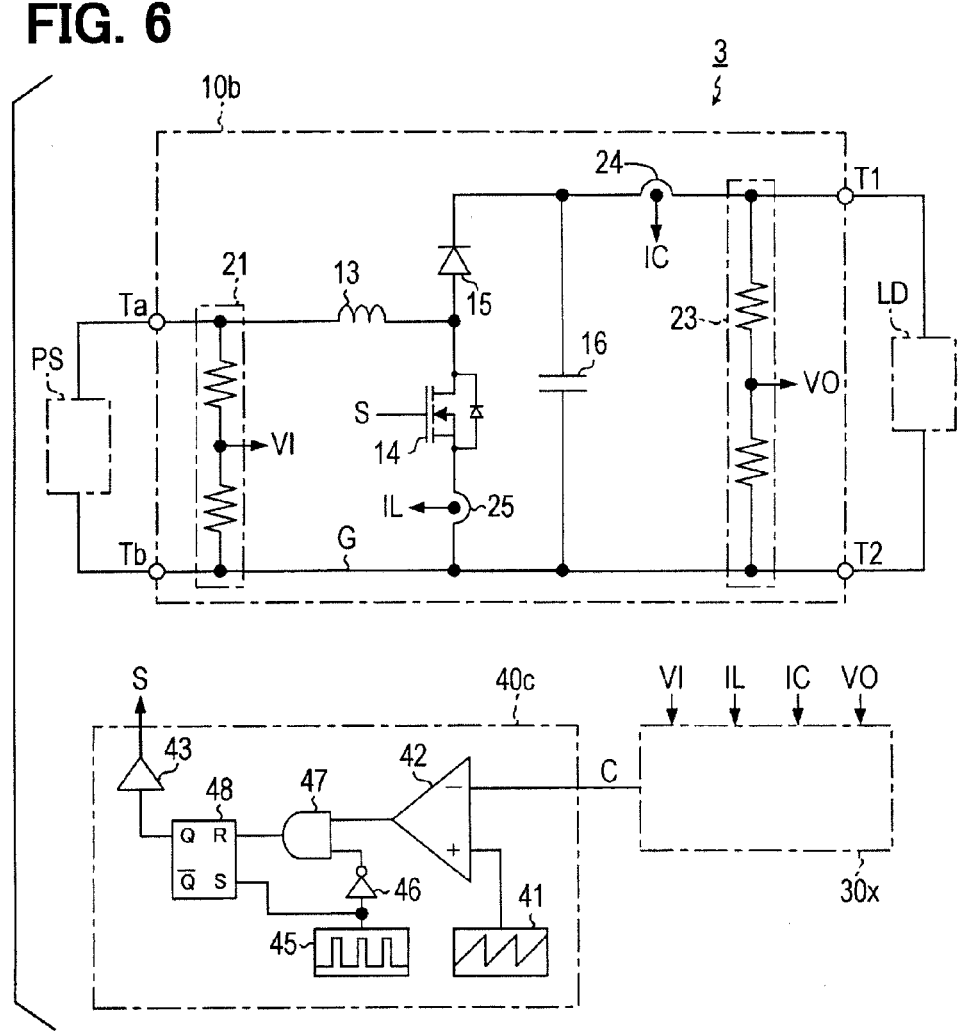
FIG. 6 is a circuit diagram showing a switching regulator according to a fifth embodiment.

A switching regulator 3 according to a fifth embodiment of the present disclosure will be described. As shown in FIG. 6, the switching regulator 3 includes a circuit section 10b, a command value generation section 30x, and a control signal generation section 40c.

In the circuit section 10b, the current detector 25 for detecting the reactor current IL is disposed between the switching element 14 and the ground line G, not between the input terminal Ta on the positive electrode side of the DC power supply PS and the choke coil 13. In other words, the current detector 25 can detect the reactor current IL when the switching element 14 is on.

The command value generation section 30x has a configuration similar to the command value generation section 30. However, the polarities of the adder forming the reference command value generation portion 31 and the adders 34, 36 reflecting the first additional command value C1 and the second additional command value C2 on the command value C are appropriately set such the smaller the output voltage VO becomes compared with the reference voltage Vref and the smaller the result of subtracting the load power from the input electric power becomes, the larger the command value C becomes, in a manner opposite from the first embodiment.

The control signal generation section 40c includes a pulse signal generation circuit 45, an inverting circuit 46, an AND circuit 47, and a RS flip-flop circuit 48 in addition to the saw-tooth wave generation circuit 41, the comparator 42, and the driver circuit 43. The pulse signal generation circuit 45 generates a pulse signal synchronized with a period of the saw-tooth wave. The inverting circuit 46 inverts the pulse signal generated by the pulse signal generation circuit 45. The AND circuit 47 outputs a signal at high level when both an output of the comparator 42 and an output of the inverting circuit 46 are at high level. The RS flip-flop circuit 48 operates using the pulse signal as a set input and an output of the AND circuit 47 as a reset input. A signal output from a positive output Q of the RS flip-flop circuit 48 is output as a switching signal S via the driver circuit 43.

In the switching regulator 3, the switching element 14 is turned on when the switching signal S transitions to the high level at a timing when the pulse signal is output. While the switching element 14 is on, the current detector 25 can correctly detect the reactor current IL. Thus, the command value generation section 30x can correctly operate and generates the command value C in accordance with the operation state of the circuit section 10b.

After that, when the saw-tooth wave exceeds the command value C, the switching signal S transitions to the low level and the switching element 14 is turned off. While the switching element 14 is off, the current detector 25 cannot detect the reactor current IL correctly. However, because the command value generation section 30x does not have to operate until the pulse signal causes the switching signal S to transition to the high level again, a problem is not caused.

As described above, the switching regulator 3 according to the present embodiment can achieve effects similar to the switching regulator 1. In addition, because electric current does not flow in the current detector 25 when the switching element 14 in off, generation of power loss in current detection can be appropriately reduced.

<Modification>

Figure 7:
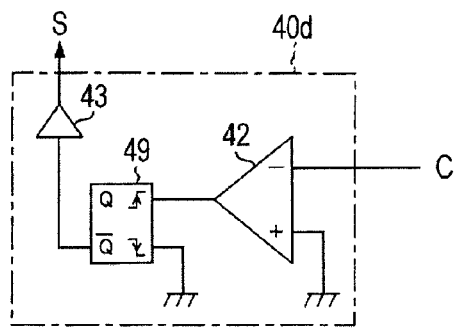
FIG. 7 is a circuit diagram showing a modification of a control signal generation section.

In cases where the reactor current IL is detected only during an on-period of the switching element 14, the control signal generation section 40c may be replaced by a control signal generation section 40d. As shown in FIG. 7, the control signal generation section 40d includes the comparator 42, a one-shot multivibrator 49, and the driver circuit 43.

In the present case, in a normal state, the switching signal S is at the high level, that is, the switching element 14 is on. When the command value C decreases below a threshold value (e.g., zero), a signal is input to the one-shot multivibrator 49, and the switching signal S transitions to the low level, that is, the switching element 14 is turned off. After a predetermined period has elapsed, a signal of the one-shot multivibrator 49 changes, and the switching signal S automatically transitions to the high level, that is, the switching element 14 is turned on. In other words, because the switching element 14 is automatically changed from off to on, the control signal generation portion 40d can function similarly to the control signal generation portion 40c, However, in the control signal generation section 40d, an off-period of the switching element 14 is fixed and only the on-period changes depending on the command value. Thus, the on-off period is unfixed.

Sixth Embodiment

Figure 8:
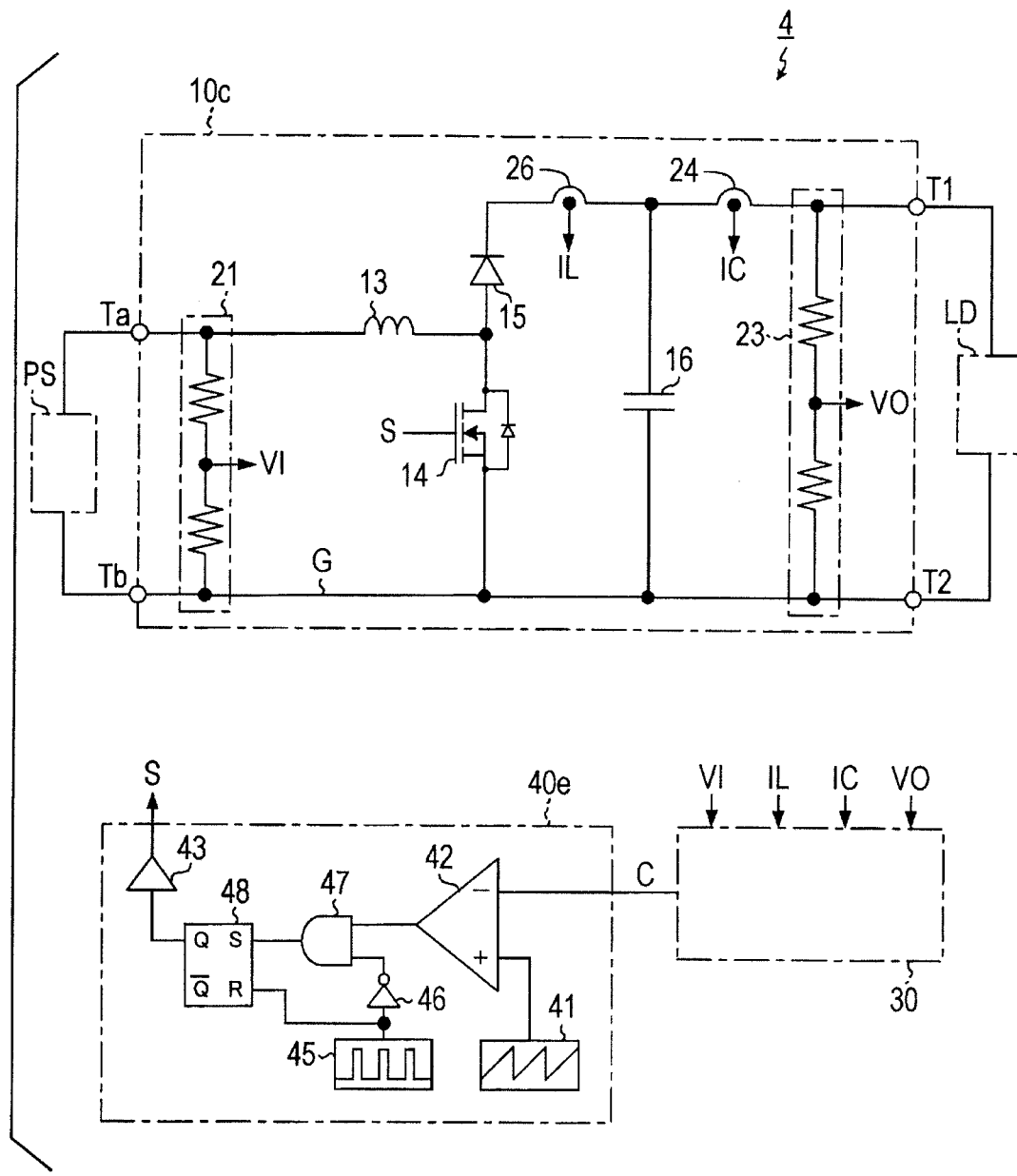
FIG. 8 is a circuit diagram showing a switching regulator according to a sixth embodiment.

A switching regulator 4 according to a sixth embodiment of the present disclosure will be described. As shown in FIG. 8, the switching regulator 4 includes a circuit section 10c, the command value generation section 30, and a control signal generation section 40e.

The circuit section 10c includes a current detector 26 detecting a reactor current IL. The current detector 26 is disposed between a cathode of the diode 15 and a connection end of the capacitor 16, not between the positive electrode of the DC power supply PS and the choke coil 13. The current detector 26 can detect the reactor current IL when the switching element 14 is off.

Thus, the switching regulator 4 uses the command value generation portion 30 described in the first embodiment, not the command value generation portion 30x described in the fifth embodiment. The control signal generation section 40e is different from the control signal generation section 40c described in the fifth embodiment in that the set input and the reset input of the RS flip-flop circuit 48 are exchanged. Thus, in the control signal generation section 40e, the switching element 14 is turned off when the pulse signal is output in a manner different from the control signal generation section 40c. While the switching element 14 is off, the current detector 26 can correctly detect the reactor current IL. Thus, the command value generation section 30 normally operates. After that, when the saw-tooth wave exceeds the command value C, the switching signal S transitions to the high level and the switching element 14 is turned on. While the switching element 14 is on, the current detector 26 cannot detect the reactor current IL correctly. However, because the command value generation section 30 does not have to operate until the pulse signal causes the switching signal S to transition to the low level again, a problem is not caused.

As described above, the switching regulator 4 according to the present embodiment can achieve effects similar to the switching regulator 1 according to the first embodiment.

<Modification>

The current detector 24 detecting the output current IC may be omitted and the output current IC may be calculated from the output voltage VO and the reactor current IL.

Figure 9A:
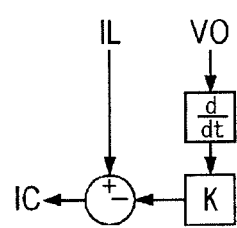
FIG. 9A is a circuit diagram showing a method of detecting an output current.

Specifically, for example, as shown in FIG. 9A, the output voltage VO is differentiated and is multiplied by a factor K depending on a capacitance value of the capacitor 16. Then, the calculated result is subtracted from the reactor current IL to calculate the output current IC.

Figure 9B:
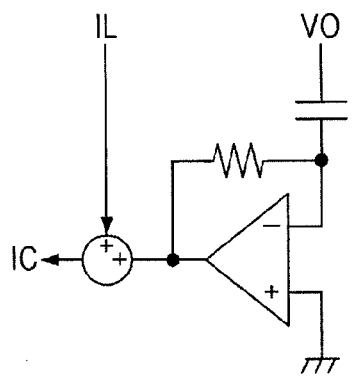
FIG. 9B is a circuit diagram showing another method of detecting an output current.

The differentiation of the output voltage VO may be performed using a differentiation circuit shown in FIG. 9B. In the present case, an output of the differentiation circuit is inverted. Thus, the polarity of addition to the reactor current IL is changed appropriately.

Also in other embodiments, the output current IC may be estimated from a differential value of the output voltage VO, and the current detector 24 detecting the output current IC may be omitted.

For example, while the switch 14 is on in the first to fifth embodiments, the output current IC may be estimated using a fact that the differential value of the output voltage VO is proportional to the output current IC, and the output of the current detector 24 may be replaced by the estimated value.

Especially in the fifth embodiment, because the command value generation section 30x does not have to operate in the off-period of the switching element 14, the output of the current detector 24 may be replaced by the differential value of the output voltage VO.

Seventh Embodiment

Next, a switching regulator 5 according to a seventh embodiment of the present disclosure will be described. Although the switching regulators described in the first to sixth embodiments operate as boost converters, the switching regulator 5 according to the present embodiment operates as a bidirectional boost converter.

Figure 10:
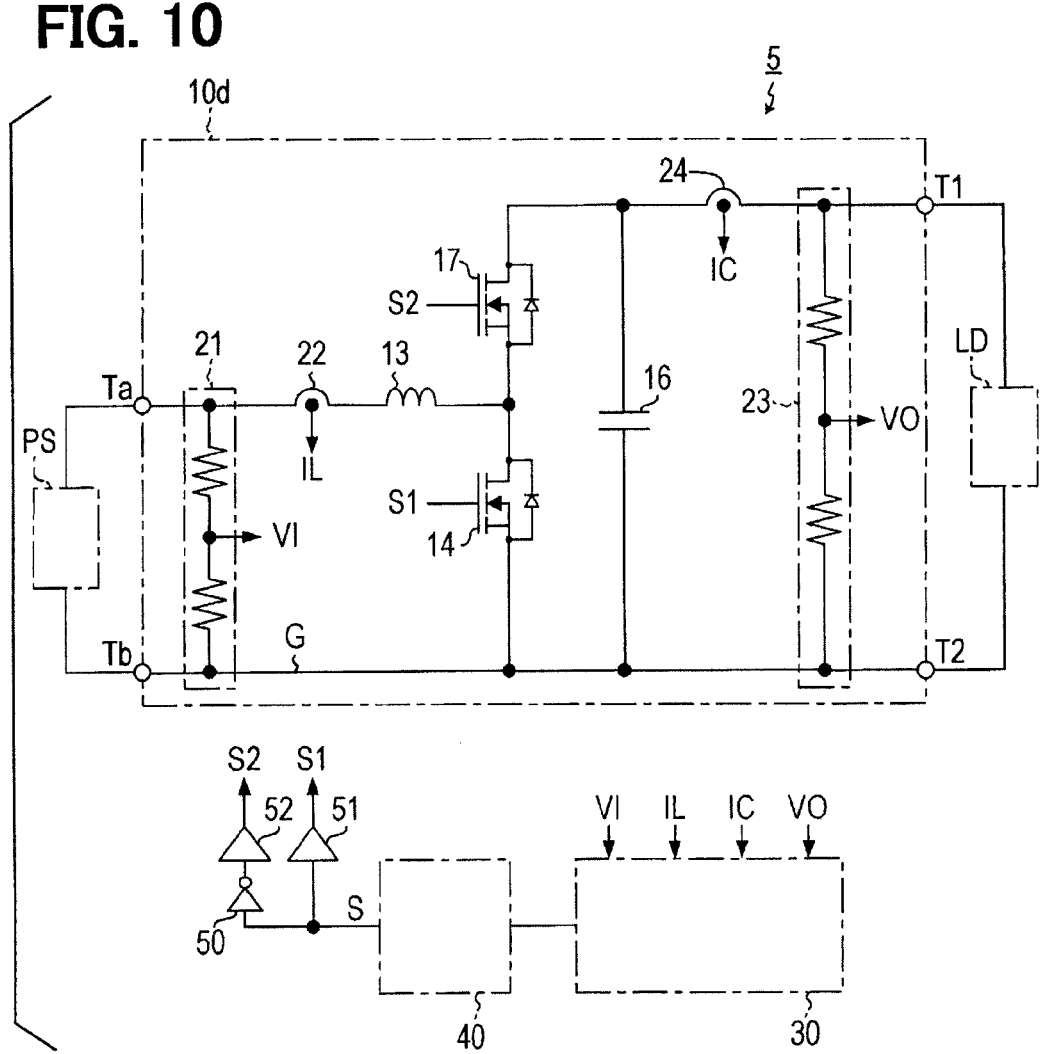
FIG. 10 is a circuit diagram showing a switching regulator according to a seventh embodiment.

As shown in FIG. 10, the switching regulator 5 includes a circuit section 10d, the command value generation section 30, and the control signal generation section 40. The switching regulator 5 further includes an inverting circuit 50, a driver circuit 51, and a driver circuit 52. The inverting circuit 50 inverts the switching signal S generated by the control signal generation section 40. The driver circuit 51 is driven by the switching signal S. The driver circuit 52 is driven by an output of the inverting circuit 50 (i.e., inverted switching signal S). The switching regulator 5 utilizes the output of the driver circuit 51 as a switching signal S1 and the output of the driver circuit 52 as a switching signal S2 to the circuit section 10d. In the present case, the driver circuit 43 of the control signal generation section 40 may be omitted.

The circuit section 10d is similar to the circuit section 10 described in the first embodiment except that a switching element 17 is provided instead of the diode 15. The switching element 14 is driven by the switching signal S1, and the switching element 17 is driven by the switching signal S2.

The switching regulator 5 operates in a manner similar to the switching regulator 1. However, because the switching element 17 is provided, electric current that flows from the load LD, which is connected between the output terminals T1 and T2, to the DC power supply PS, which is connected between the input terminals Ta and Tb, is not intercepted. Thus, bidirectional power supply is allowed.

As described above, the switching regulator 5 according to the present embodiment can achieve effects similar to the switching regulator 1 according to the first embodiment. In addition, when the DC power supply PS is a rechargeable battery, the switching regulator 5 can be used for charging the DC power supply PS.

Any configuration described in the second to seventh embodiments may be applied to the switching regulator 5.

Eighth Embodiment

A switching regulator 6 according to an eighth embodiment of the present disclosure will be described.

Figure 11:
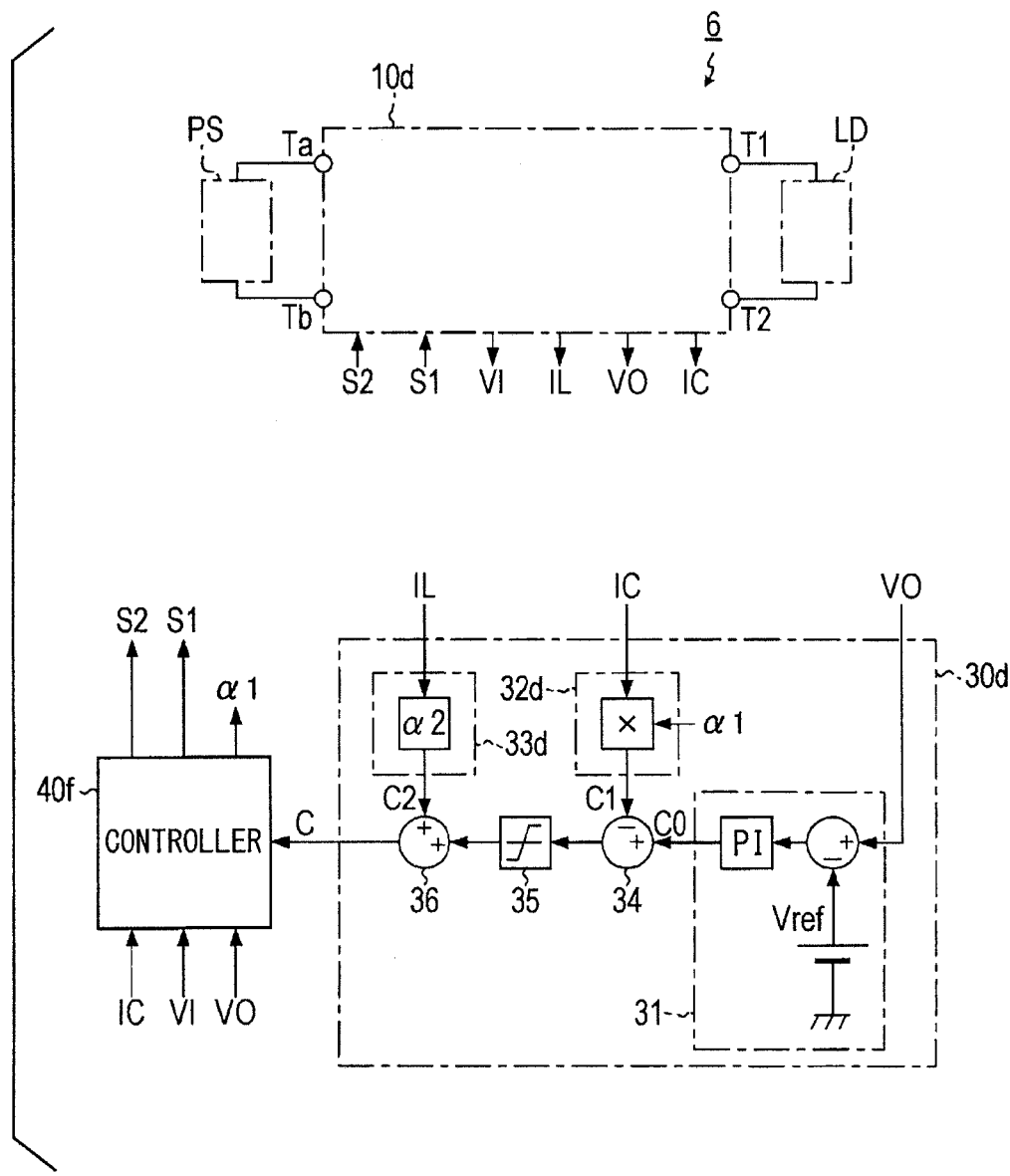
FIG. 11 is a circuit diagram showing a switching regulator according to an eighth embodiment.

As shown in FIG. 11, the switching regulator 6 includes the circuit section 10d, a command value generation section 30d, and a control signal generation section 40f. Thus, the switching regulator 6 according to the present embodiment is different from the switching regulator 5 according to the seventh embodiment in configurations of the command value generation section 30d and the control signal generation section 40f. Thus, different part will be mainly described.

The command value generation section 30d includes a first additional command value generation portion 32d and a second additional command value generation portion 33d.

The first additional command value generation portion 32d outputs the output current IC multiplied by a factor α1 supplied from the control signal generation section 40f as a first additional command value C1. The second additional command value generation portion 33d outputs the reactor current IL multiplied by a factor a2 as a second additional command value C2.

The control signal generation section 40l includes a controller. The controller generates the switching signals S1, S2 and the factor α1 based on the command value C, the input voltage VI, the output voltage VO, and the output current IC.

Specifically, the control signal generation section 40f generates the switching signal S and the inverted switching signal S and separately outputs the switching signal S and the inverted switching signal S as the switching signals S1, S2.

When the polarity of the output current IC is positive, that is, when the output current IC flows in a forward direction (direction from the DC power supply PS toward the load LD), the switching signal S2 is kept at the low level. Accordingly, the operation of the switching element 17 is prohibited. In this time, the switching element 17 operates as a diode that has a forward direction in a direction from the choke coil 13 to the output terminal T1. Thus, the circuit section 10d has a circuit configuration similar to the circuit section 10. In other words, the circuit section 10d has a configuration as a boost converter.

On the other hand, when the polarity of the output current IC is negative, that is, when the output current IC flows in the reverse direction (direction from the load LD toward the DC power supply PS), the switching signal S1 is kept at the low level. Accordingly, the operation of the switching element 14 is prohibited. In this time, the switching element operates as a diode that has a forward direction in a direction from the ground line G to the choke coil 13. Thus, the circuit section 10d has a circuit configuration as a buck converter in which the output terminals T1, T2 are input side and the input terminals Ta, Tb are output side (load side).

The control signal generation section 40f outputs the factor α1 calculated from the following equation (14) based on the input voltage VI, the output voltage VO, and the factor α2.

$$\alpha 1 = \frac{VO}{VI} \times \alpha 2 \qquad (14)$$

Hereafter, an operation mode in which the operation of the switching element 17 is prohibited is referred to as a boost mode, and an operation mode in which the operation of the switching element 14 is prohibited is referred to as a buck mode. As described above, the switching regulator 6 switches the operation mode based on the direction in which the output current IC flows. In addition, the switching regulator 6 adjusts the method of generating the first additional command value C1 and the second additional command value C2 indicating the inflow electric energy and the outflow electric energy (i.e., the value of the factor α1) in accordance with change in the input voltage VI and the output voltage VO. Thus, the effects of the present embodiment can be expected in any operation state.

In the present embodiment, the factor α1 is variable. Alternatively, the factor α1 may be fixed and the factor a2 may be variable.

Ninth Embodiment

A switching regulator 7 according to a ninth embodiment of the present disclosure will be described.

Figure 12:
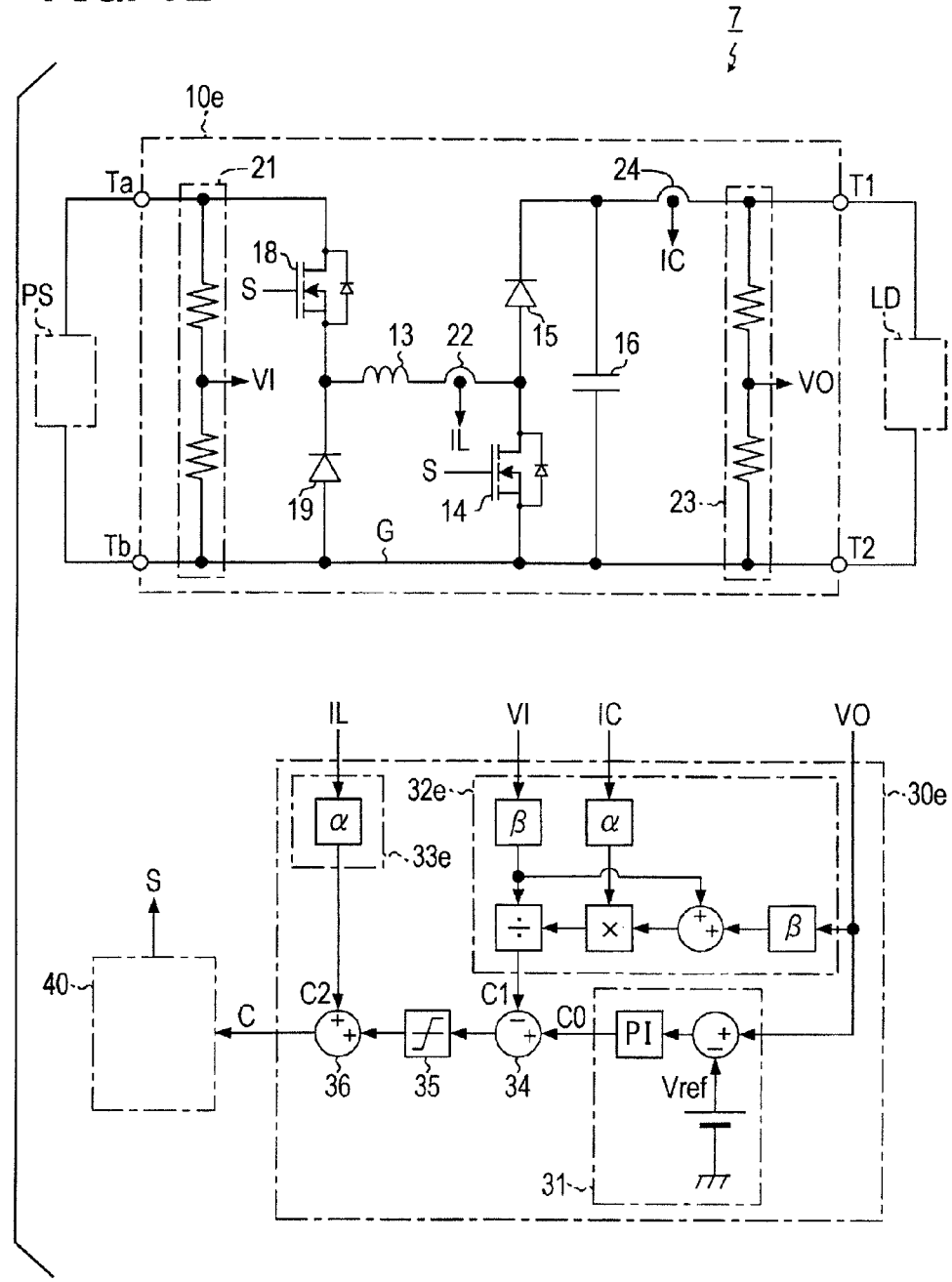
FIG. 12 is a circuit diagram showing a switching regulator according to a ninth embodiment.

The switching regulator 7 operates as a buck-boost converter. As shown in FIG. 12, the switching regulator 7 includes a circuit section 10e, a command value generation section 30e, and the control signal generation section 40. The description about the control signal generation section 40 will be omitted, and the circuit section 10e and the command value generation section 30e having configurations different from other embodiments will be mainly described.

The circuit section 10e has a configuration similar to the circuit section 10 except that the circuit section 10e includes a switching element 18 and a diode 19. The switching element 18 connects and disconnects the current path from the input terminal Ta on the positive electrode side of the DC power supply PS to the choke coil 13. The diode 19 has a forward direction in a direction from the ground line G to a connection point of the switching element 18 and the choke coil 13. The current detector 22 detecting the reactor current IL is disposed between the choke coil 13 and a connection point of the diode 15 and the switching element 14.

The switching elements 14, 18 are tuned on or off at the same time based on the same switching signal S. While the switching elements 14, 18 are on, electric current flows in a closed circuit formed by the DC power supply PS, the switching element 18, the choke coil 13, and the switching element 14. While the switching elements 14, 18 are off, electric current flows in a closed circuit formed by the diode 19, the choke coil 13, the diode 15, and the load LD.

The command value generation section 30e includes a first additional command value generation portion 32e and a second additional command value generation portion 33e.

The first additional command value generation portion 32e calculates the sum of the input voltage VI multiplied by the factor 13 and the output voltage VO multiplied by the factor β, and calculates the product of the above-described sum and the output current IC multiplied by the factor α. Then, the first additional command value generation portion 32e outputs the quotient when the above-described product is divided by the input voltage VI multiplied by the factor 13 as a first additional command value C1.

The second additional command value generation portion 33e outputs the reactor current IL multiplied by the factor α as a second additional command value C2. In the circuit section 10 having a configuration as the buck-boost converter, when the duty ratio of on and off of the switching elements 14, 18 is denoted by D, the following equation (15) is satisfied. Then, when the equation (15) is solved for D, the equation (16) is obtained. The left-hand member of the equation (15) indicates the electric power supplied from the DC-power supply PS (I.e., inflow electric energy), and the right-hand member of the equation (15) indicates the electric power supplied from the choke coil 13 to the capacitor 16 (i.e., inflow electric energy).

$$D \times VI \times IL = (1-D) \times VO \times IL \quad (15)$$

$$D = \frac{VO}{VI \times VO} \quad (16)$$

When the circuit section 10e is in the steady operation state, the electric power supplied to the capacitor 16 (inflow electric energy: the right-hand member of the equation (15)) is equal to the electric power supplied from the capacitor 16 to the load LD (outflow electric energy). Thus, the following equation (17) is satisfied. When the equation (16) is substituted in the equation (17) and is solved for the reactor current IL, the equation (18) is obtained.

$$(1-D) \times VO \times IL = VO \times IC \quad (17)$$

$$IL = \frac{VI + VO}{VI} \times IC \quad (18)$$

In other words, the configuration of the first additional command value generation portion 32e calculates the right-hand member of the equation (18), that is, indicates a method of calculating an estimated value of the reactor current IL based on the input voltage VI, the output voltage VO, and the output current IC in the buck-boost converter.

As described above, the switching regulator 7 according to the present embodiment can achieve effects similar to the switching regulator 1 according to the first embodiment. In addition, because the switching regulator 7 can generate the voltage higher or lower than the voltage applied to the input terminals Ta, Tb (I.e the power supply voltage of the DC power supply PS), the switching regulator 7 can be applied to various loads LD.

<Modification>

Figure 13A:
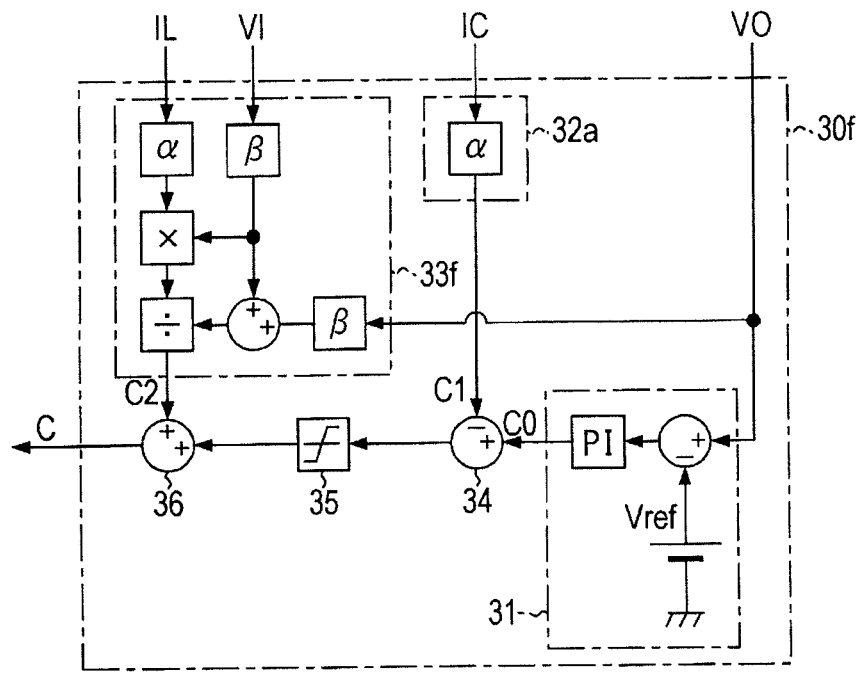
FIG. 13A is a control block diagram showing a modification of a control signal generation section.
Figure 13B:
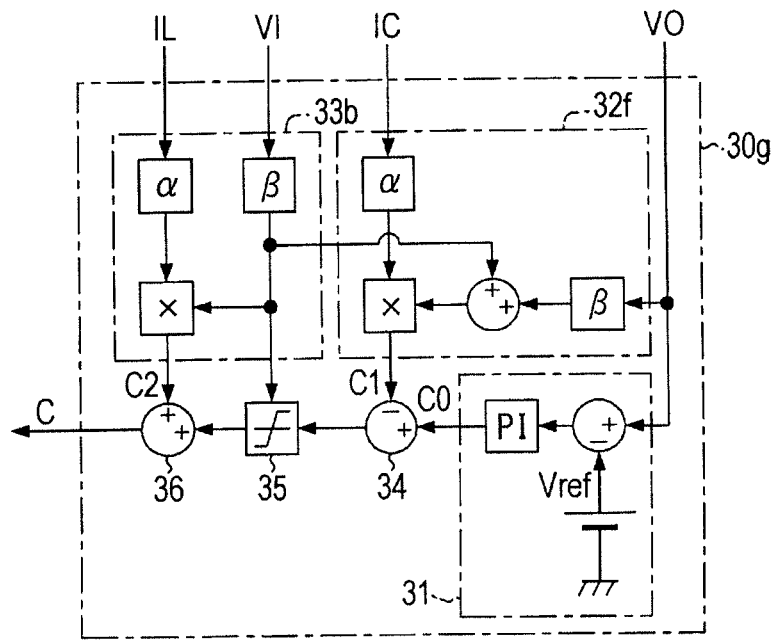
FIG. 13B is a control block diagram showing another modification of a control signal generation section.

The command value generation section 30e performs the multiplication using the sum of the input voltage multiplied by the factor β and the output voltage VO multiplied by the factor β in a manner different from the command value generation section 30 that performs the multiplication using the output voltage multiplied by the factor β. In a similar manner, a command value generation section 30f shown in FIG. 13A may be used. The command value generation section 30f has a configuration similar to the command value generation section shown in FIG. 3 except that the command value generation section 30f includes a second additional command value generation portion 33f instead of the second additional command value generation portion 33a. The second additional command value generation portion 33a performs the division using the output voltage multiplied by the factor β. However the second additional command value generation section 30f performs a division using the sum of the input voltage VI multiplied by the factor β and the output voltage VO multiplied by the factor β. As another example, as shown in FIG. 13B, a command value generation section 30g may be used. The command value generation section 30g has a configuration similar to the command value generation section shown in FIG. 4 except that the command value generation section 30g includes a first additional command value generation portion 32g instead of the first additional command value generation portion 33b. The first additional command value generation portion 33b performs the multiplication using the output voltage VO multiplied by the factor 3. However, the first additional command value generation portion 32g performs a multiplication using the sum of the input voltage VI multiplied by the factor 13 and the output voltage VO multiplied by the factor 13.

Tenth Embodiment

A switching regulator 8 according to a tenth embodiment of the present disclosure will be described. The switching regulator 8 operates as an inverting buck-boost converter.

Figure 14:
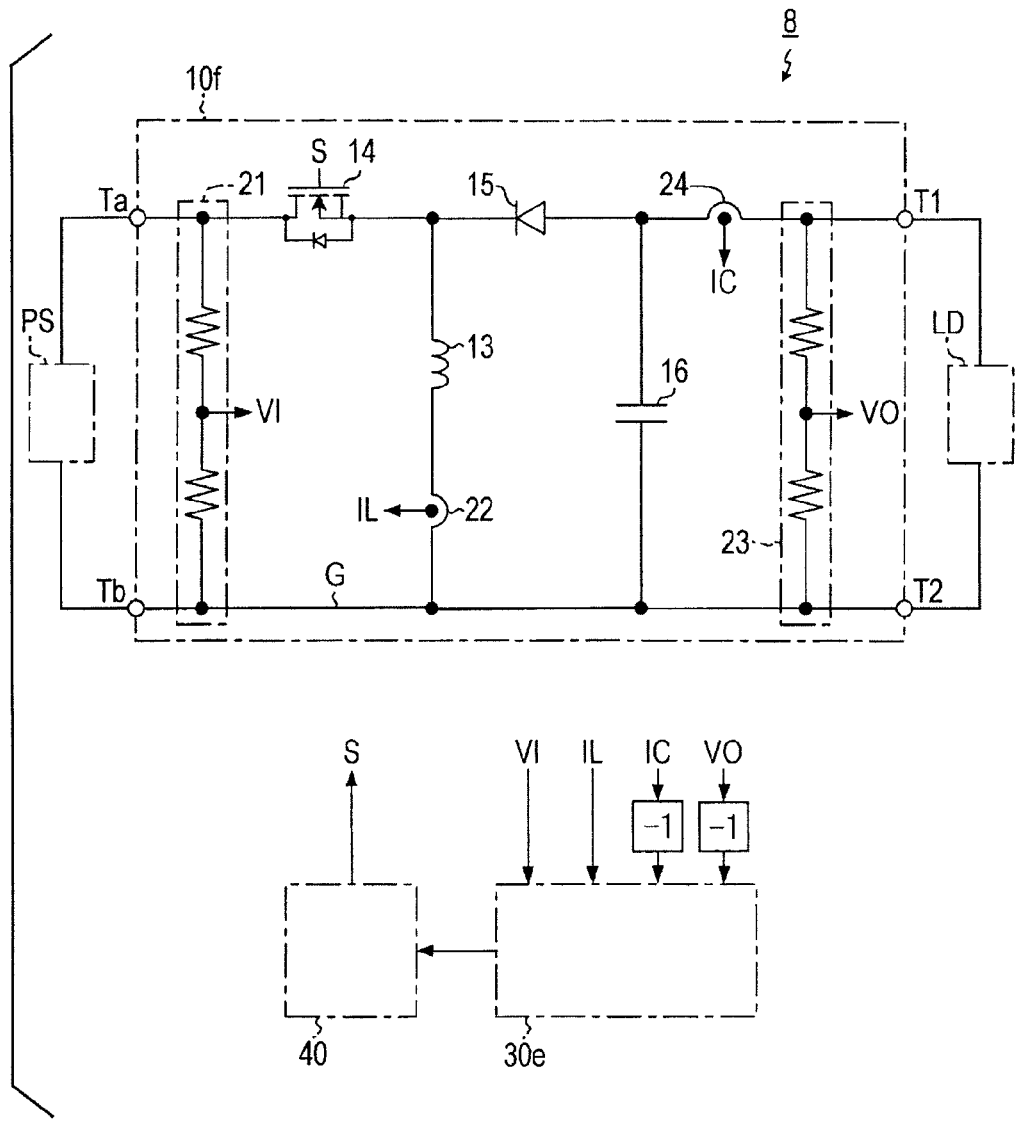
FIG. 14 is a circuit diagram showing a switching regulator according to a tenth embodiment.

As shown in FIG. 14, the switching regulator 8 includes a circuit section 10f, the command value generation section 30e, and the control signal generation section 40. The descriptions of the command value generation section 30e and the control signal generation section 40 will be omitted. The output current IC and the output voltage VO are input to the command value generation section 30e in a state where the polarities of the output current IC and the output voltage VO are inverted. The circuit section 10f having a configuration different from other embodiments will be mainly described below.

The circuit section 10f is different from the circuit section 10 in that attaching positions of the switching element 14 and the choke coil 13 are exchanged, the diode 15 is connected in the reverse direction, and a current detector 22 detecting the reactor current IL is disposed between the choke coil 13 and the ground line G.

In the circuit section 10f having the above-described configuration, while the switching element 14 is on, electric current flows in a closed circuit formed by the DC power supply PS, the switching element 14, the choke coil 13, and the choke coil 13 is charged with magnetic energy.

After that, while the switching element 14 is off, electric current flows in a closed circuit formed by the load LD, the diode 15, and the choke coil 13, and the voltage having a negative polarity is applied to the load LD.

In the circuit section 1 Of, the polarity of the output voltage VO detected by the voltage dividing circuit 23 and the polarity of the output current IC detected by the current detector 24 are inverted compared with the circuit section 10. Thus, the polarities of the output voltage VO and the output current IC have to be inverted before supplied to the command value generation section 30e.

The switching regulator 8 according to the present embodiment can achieve effects similar to the switching regulator 1 according to the first embodiment.

Eleventh Embodiment

A switching regulator 9 according to an eleventh embodiment of the present disclosure will be described. The switching regulator 9 operates in three operation modes including a boost mode, a buck mode, and a buck-boost mode.

Figure 15:
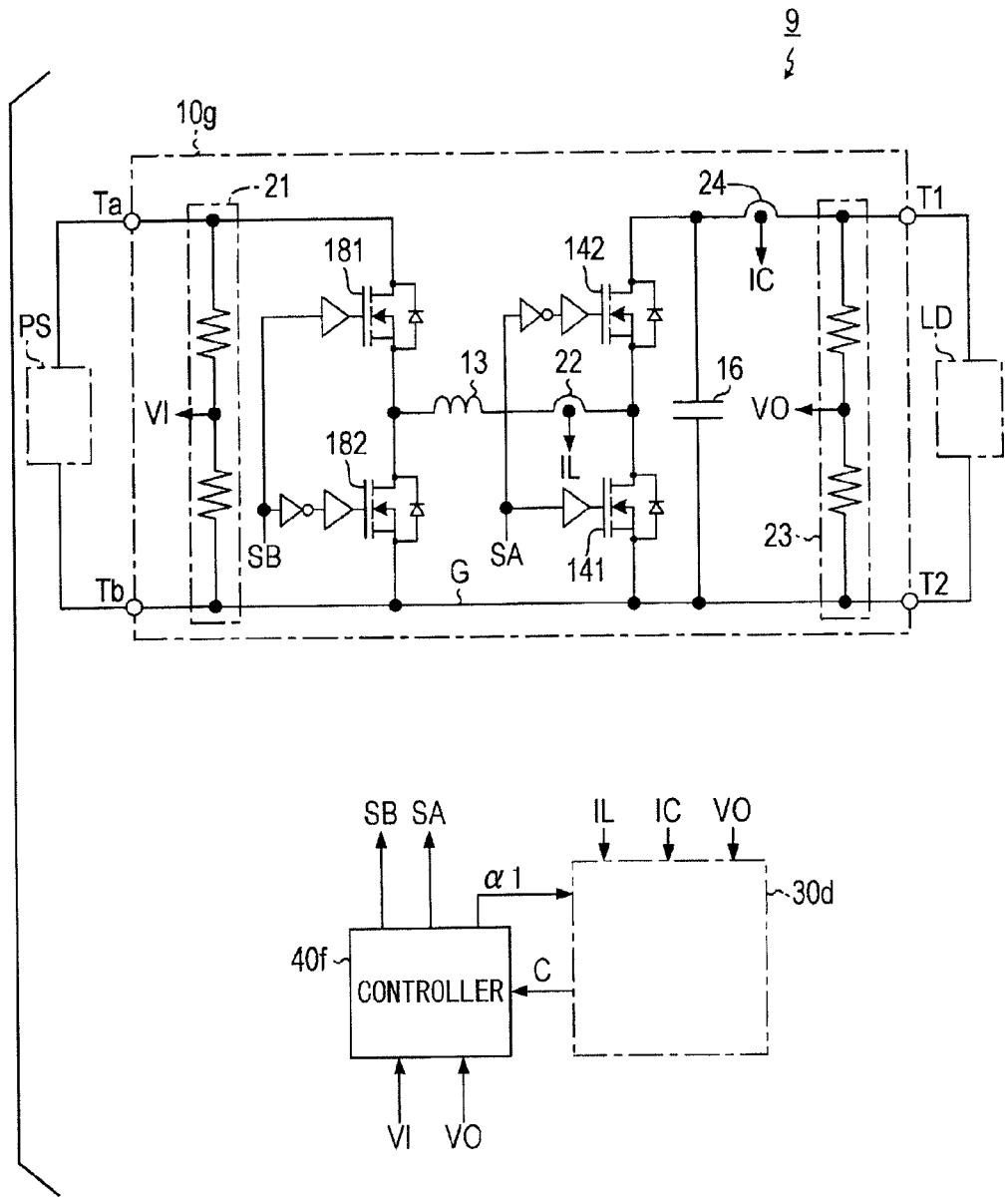
FIG. 15 is a circuit diagram showing a switching regulator according to an eleventh embodiment.

As shown in FIG. 15, the switching regulator 9 includes a circuit section 10g, the command value generation section 30d, and the control signal generation section 40f. The command value generation section 30d has been described in the eighth embodiment with reference to FIG. 11. Thus, the circuit section 10g and the control signal generation section 40f having configurations different from other embodiments will be mainly described.

The circuit section 10g is different from the circuit section 10e described in the ninth embodiment with reference to FIG. 12 in that switching elements 142, 182 are provided instead of the diodes 15, 19. The switching elements 14, 18 are shown as switching elements 141, 181.

The switching elements 141, 142 are disposed between the choke coil 13 and the output terminals T1, T2. The switching elements 141, 142 operate exclusively based on a switching signal SA. In other words, when one of the switching elements 141, 142 is on, the other of the switching elements 141, 142 is off. The switching elements 181, 182 are disposed between the choke coil 13 and the input terminals Ta, Tb. The switching elements 181, 182 operate exclusively based on the switching signal SB.

The switching element 141 receives the switching signal SA through a driver circuit. The switching element 142 receives the switching signal SA through an inverting circuit and a driver circuit. The switching element 181 receives a switching signal SB through a driver circuit. The switching element 182 receives the switching signal SB through an inverting circuit and a driver circuit.

Hereafter, an operation mode in which the switching signal SA is fixed at the low level (i.e., the switching element 141 is fixed at off and the switching element 142 is fixed at on) and the switching elements 181, 182 are operated by the switching signal SB is referred to as the buck mode.

In addition, an operation mode in which the switching signal SB is fixed at the high level (i.e., the switching element 181 is fixed at on and the switching element 182 is fixed at off) and the switching elements 141, 142 are operated with the switching signal SA is referred to as the boost mode.

Furthermore, an operation mode in which the switching signals SA, SB are set at the same signal, and a pair of switching elements 141, 181 and a pair of switching elements 142, 182 are exclusively operated is referred to as the buck-boost mode.

The control signal generation section 40f includes a controller. The controller generates the switching signals SA, SB and the factor α1 based on the command value C, the input voltage VI, the output voltage VO, and the output current IC.

The control signal generation section 40f generates a PWM signal (switching signal S) based on the command value C. In addition, the control signal generation section 40f calculates a voltage ratio H (=VO/VI) of the output voltage VO with respect to the input voltage VI and controls the values of the switching signals SA, SB and the factor α1 based on the voltage ratio H.

Specifically, in a case where the calculated voltage ratio H is smaller than a buck mode threshold value Th1 that is smaller than 1 (i.e., H<Th1<1), the control signal generation section 40f outputs a2 as the factor α1. In addition, the control signal generation section 40f outputs the PWM signal based on the command value C as the switching signal SA and outputs a fixed value at the low level as the switching signal SB. Accordingly, the circuit section 10g operates in the buck mode.

In a case where the calculated voltage ratio H is larger than a boost mode threshold value Th2 that is larger than 1 (i.e., H>Th2>1), the control signal generation section 40f outputs α2×(VO/VI) as the factor α1. In addition, the control signal generation section 40f outputs a fixed value at the high level as the switching signal SA and outputs the PWM signal based on the command value C as the switching signal SB. Accordingly, the circuit section 10g operates in the boost mode.

In a case where the calculated voltage ratio H is larger than or equal to the buck mode threshold value Th1 and is smaller than or equal to the boost mode threshold value Th2 (i.e., Th1≤H≤Th2), the control signal generation section 40f outputs α2×(VI+VO)/VI as the factor a2. In addition, the control signal generation section 40f outputs the PWM signals based on the command value C as the switching signals SA, SB. Accordingly, the circuit section 10 operates in the buck-boost operation mode.

The switching regulator 9 according to the present embodiment changes the operation mode based on the voltage ratio H. In addition, the switching regulator 9 changes the method of generating the first additional command Value C1 and the second additional command value C2, that is, the value of the factor α1 used for generating the first additional command value C1 and the second additional command value C2 based on the operation mode. Thus, in any operation mode, the switching regulator 9 can achieve effects similar to the switching regulator 1 according to the first embodiment.

In the present embodiment, the factor α1 is variable. Alternatively, the factor α1 may be fixed and the factor α2 may be variable.

Twelfth Embodiment

A motor driving system 60 according to a twelfth embodiment of the present disclosure will be described.

Figure 16:
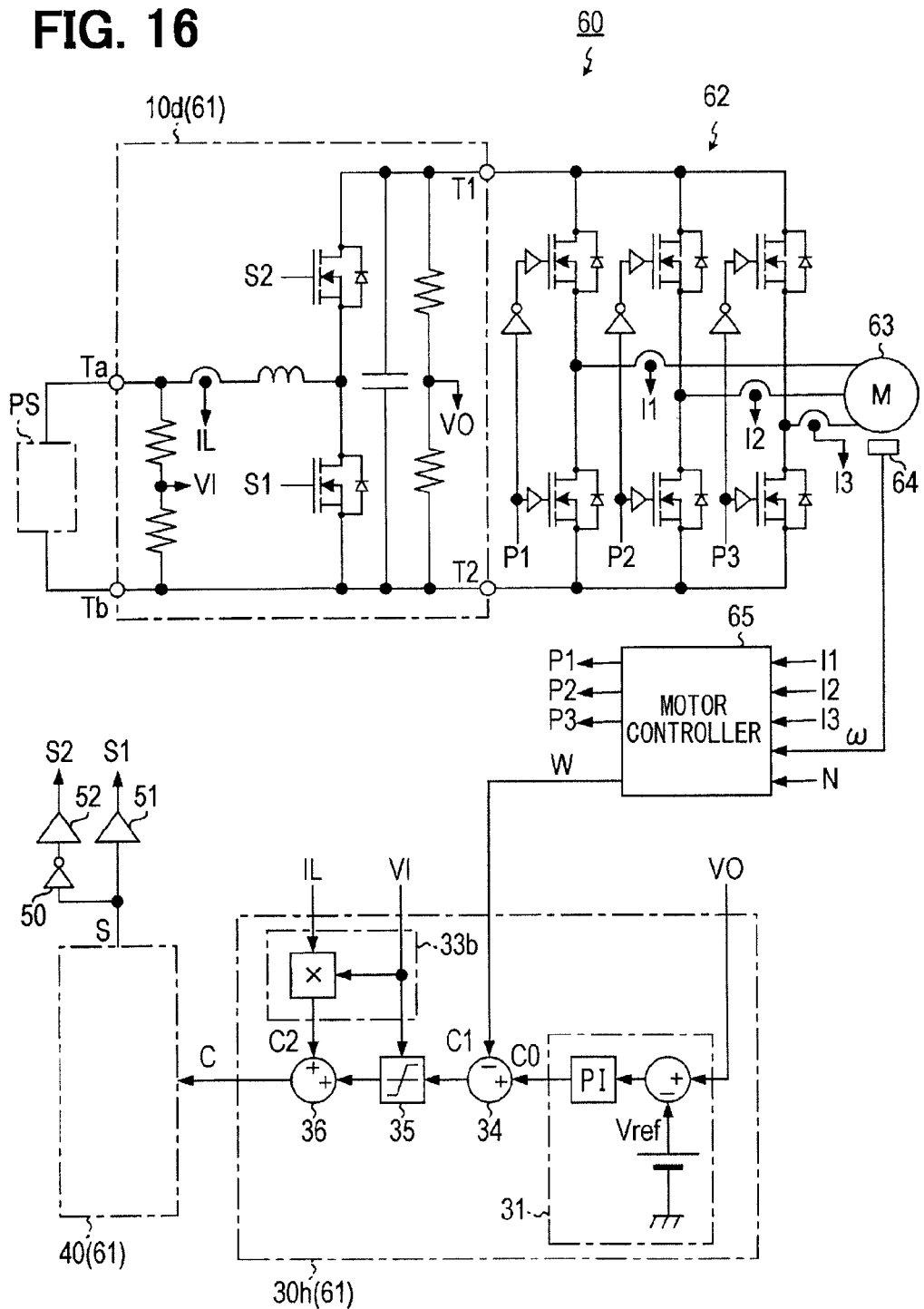
FIG. 16 is a circuit diagram showing a motor driving system according to a twelfth embodiment.

The motor driving system 60 uses a switching regulator operating as a bidirectional converter and drives a motor driving circuit as a load LD. As shown in FIG. 16, the motor driving system 60 includes a switching regulator 61, a motor driving circuit 62, a motor 63, a rotational speed sensor 64, and a motor controller 65. The switching regulator 61 includes the circuit section 10d, a command value generation section 30h, and the control signal generation section 40. The motor driving circuit 62 operates by receiving electric power supplied from the switching regulator 61. The motor 63 is driven by the motor driving circuit 62. The rotational speed sensor 64 detects a rotational speed of the motor 63. The motor controller 65 controls the motor driving circuit 62.

The motor driving circuit 62 includes a known three-phase bridge circuit Three phases of the motor are respectively driven by gate signals P1 through P3. The motor driving circuit 62 includes current detectors that detect currents I1 through I3 of the respective phases.

The motor controller 65 is a known motor controller that generates the gate signals P1 through P3 based on the currents I1 through I3 detected by the current detectors of the respective phases, a torque command value N input from an external device, and a rotational speed ω detected by the rotational speed sensor 64. The motor controller 65 also outputs a load power W (=N×ω) calculated from the torque command value N and the rotational speed ω.

The switching regulator 61 is different from the switching regulator 5 according to the seventh embodiment described with reference to FIG. 10 in that the switching regulator 61 includes a command value generation section 30h instead of the command value generation section 30. However, the circuit section 10d does not include the current detector 24 that detects the load current IC.

The command value generation section 30h is different from the command value generation section 30b described in the third embodiment with reference to FIG. 4 in that the command value generation section 30h does not include the first additional value generation portion 32b. The command value generation section 30h uses the load power W supplied from the motor controller 65 as a first additional command value C1.

In the description of the present embodiment, the factors α, β are omitted for simplification. As described above, in the motor driving system 60, the switching regulator 61 detects the load change based on the difference between the load power W indicating the outflow electric energy and power indicating the inflow electric energy and calculated from the reactor current IL and the input voltage VI and reflects the load change on the command value C. Thus, the switching regulator 61 can achieve effects similar to the switching regulator according to the first embodiment.

<Modification>

The load power W may be calculated by multiplying a voltage amplitude of the motor 63 by the detected values of the currents I1 through I3. The load power W may also be calculated by adapting the detected values of the currents I1 through I3 and an output of an angle sensor of the motor 63 to a theory of a predetermined motor model. The load power divided by the input voltage VI may be set to the first additional command value C1 and the reactor current IL may be set to the second additional command value C2 to calculate the command value C.

Other Embodiments

Although the present disclosure has been fully described in connection with the exemplary embodiments thereof with reference to the accompanying drawings, it is to be noted that various changes and modifications will become apparent to those skilled in the art For example, the technologies described in the respective embodiments may be replaced by each other within a range not conflicting to each other. In the present case, the polarities of the signals may be appropriately changed in accordance with the control method.

What is claimed is:

1. A switching regulator comprising:
two input terminals to which a direct-current voltage is applied;
two output terminals;
a reactor;
a capacitor disposed between the output terminals and charged with a supply current from the reactor;
a switching circuit having a first operation state in which the direct-current voltage is supplied to two ends of the reactor through the input terminals and a second operation state in which at least the reactor and a load connected between the output terminals form a closed circuit, the switching circuit switching an operation state between the first operation state and the second operation state; and
a control circuit controlling an operation ratio of the first operation state and the second operation state in the switching circuit,
wherein the control circuit includes a reference command value generation portion and an additional command value generation portion,
wherein the reference command value generation portion generates a reference command value based on a deviation of an output voltage, which is a voltage across the output terminals, from a predetermined command voltage,
wherein the additional command value generation portion generates an additional command value based on a difference between outflow electric energy and inflow electric energy, the outflow electric energy is a value reflecting a supply power from the capacitor to the load, the inflow electric energy is a value reflecting a supply power from the reactor to the capacitor, and
wherein the control circuit controls the operation ratio based on the reference command value and the additional command value such that the smaller the output voltage becomes compared with the command voltage and the larger the outflow electric energy becomes compared with the inflow electric energy, the larger a ratio of the first operation state becomes.

2. The switching regulator according to claim 1,
wherein the additional command value generation portion includes a first adding portion and a second adding portion,
wherein one of the outflow electric energy and the inflow electric energy is a first additional command value and the other of the outflow electric energy and the inflow electric energy is a second additional command value,
wherein the first adding portion adds the first additional command value to the reference command value, and
wherein the second adding portion adds the second additional command value to an output of the first adding portion in a polarity opposite from the first additional command value.

3. The switching regulator according to claim 2,
wherein the additional command value generation portion further includes a limiting portion limiting at least one of an upper limit and a lower limit of the output of the first adding portion.

4. The switching regulator according to claim 1,
wherein the switching circuit has an operation state in which the switching circuit operates as one of a boost converter, a buck-boost converter, and an inverting buck-boost converter.

5. The switching regulator according to claim 1,
wherein, as the inflow electric energy, the additional command value generation portion uses a reactor current flowing in the reactor, and
wherein, as the outflow electric energy, the additional command value generation portion uses an estimated value of the reactor current calculated from a supply power to the load on assumption of a steady operation of the switching regulator.

6. The switching regulator according to claim 1,
wherein, as the outflow electric energy, the additional command value generation portion uses an output current to the load, and
wherein, as the inflow electric energy, the additional command value generation portion uses an estimated value of the output current calculated from a reactor current flowing in the reactor on assumption of a steady operation of the switching regulator.

7. The switching regulator according to claim 1,
wherein, as the outflow electric energy, the additional command value generation portion uses a supply power to the load, and
wherein, as the inflow electric energy, the additional command value generation portion uses an estimated value of the supply power calculated from a reactor current flowing in the reactor on assumption of a steady operation of the switching regulator.

8. The switching regulator according to claim 1,
wherein, as the outflow electric energy, the additional command value generation portion uses a value calculated by multiplying an output current to the load by a predetermined first factor,
wherein, as the inflow electric energy, the additional command value generation portion uses a value calculated by multiplying a reactor current flowing in the reactor by a predetermined second factor, and
wherein the predetermined fast factor and the predetermined second factor are set such that the outflow electric energy is equal to the inflow electric energy when the switching circuit is in a steady operation state.

9. The switching regulator according to claim 1,
wherein, as a reactor current flowing in the reactor, the additional command value generation portion detects an input current from the input terminal.

10. The switching regulator according to claim 1,
wherein, as a reactor current flowing in the reactor, the additional command value generation portion detects an electric current that flows in the closed circuit including the reactor in the second operation state.

11. The switching regulator according to claim 1,
wherein, as a reactor current flowing in the reactor, the additional command value generation portion detects an electric current that flows in the closed circuit including the reactor in the first operation state.

12. The switching regulator according to claim 1,
wherein the additional command value generation portion calculates the outflow electric energy using a differential value of a voltage of the capacitor in at least one of the first operation state and the second operation state.

13. The switching regulator according to claim 1,
wherein the control circuit calculates the outflow electric energy using estimated information of a load power or a load current provided from a load system connected to the output terminals.

* * * * *